United States Patent
Dill et al.

(10) Patent No.: US 12,145,476 B2
(45) Date of Patent: Nov. 19, 2024

(54) VEHICLE SEAT

(71) Applicant: Adient US LLC, Plymouth, MI (US)

(72) Inventors: Thomas Dill, Heiligenmoschel (DE); Viktor Enns, Kaiserslautern (DE); Christian Wolf, Dielkirchen (DE); Darius Wrobel, Mehlingen (DE)

(73) Assignee: Adient US LLC, Plymouth, MI (US)

( * ) Notice: Subject to any disclaimer, the term of this patent is extended or adjusted under 35 U.S.C. 154(b) by 305 days.

(21) Appl. No.: 17/756,965

(22) PCT Filed: Dec. 9, 2020

(86) PCT No.: PCT/EP2020/085320
§ 371 (c)(1),
(2) Date: Jun. 7, 2022

(87) PCT Pub. No.: WO2021/116190
PCT Pub. Date: Jun. 17, 2021

(65) Prior Publication Data
US 2023/0028374 A1    Jan. 26, 2023

(30) Foreign Application Priority Data

Dec. 10, 2019 (DE) .................... 10 2019 133 619.8
Apr. 20, 2020 (DE) .................... 10 2020 110 623.8

(51) Int. Cl.
*B60N 2/14* (2006.01)
*B60N 2/015* (2006.01)
(Continued)

(52) U.S. Cl.
CPC ....... *B60N 2/0268* (2023.08); *B60N 2/01583* (2013.01); *B60N 2/02246* (2023.08);
(Continued)

(58) Field of Classification Search
CPC . B60N 2/12; B60N 2/14; B60N 2/146; B60N 2/02246; B60N 2002/0055; B60N 2210/46
(Continued)

(56) References Cited

U.S. PATENT DOCUMENTS

2016/0318424 A1    11/2016    Dlugokecki et al.

FOREIGN PATENT DOCUMENTS

| DE | 102008050468 B3 | 4/2010 |
| DE | 202016101883 U1 | 9/2016 |
| JP | S6094840 A | 5/1985 |

OTHER PUBLICATIONS

European Patent Office, International Search Report and Written Opinion in Application No. PCT/EP2020/085320, dated Mar. 5, 2021, 11 pages, Rijswijk Netherlands.

*Primary Examiner* — Dennis H Pedder
(74) *Attorney, Agent, or Firm* — Marshall & Melhorn, LLC

(57) ABSTRACT

A motor vehicle seat may have a seat squab, a back rest, and kinematics for moving the vehicle seat from a use position suitable for conveying people to a non-use position or access position. The access position makes accessing a rear row of seats easier. The seat may be moved by a drive device from the use position to the non-use position, and vice versa. The seat may have a rear foot with a locking device that can be locked with a counter-element for securing in the use position. The seat may also have a protection device arranged in the region of the locking device for detecting an obstacle in a movement path of the rear foot when the vehicle seat is moved from the non-use position to the use position.

12 Claims, 3 Drawing Sheets

(51) Int. Cl.
*B60N 2/02* (2006.01)
*B60N 2/12* (2006.01)
*B60N 2/60* (2006.01)
*B60N 2/005* (2006.01)

(52) U.S. Cl.
CPC ............. *B60N 2/12* (2013.01); *B60N 2/6009* (2013.01); *B60N 2002/0055* (2013.01)

(58) Field of Classification Search
USPC .................. 296/65.05, 65.08; 297/325–327, 297/329–331, 335–336
See application file for complete search history.

VEHICLE SEAT

FIELD

The invention relates to a vehicle seat, in particular a motor-vehicle seat, having a seat part, a backrest, and a kinematics mechanism for transferring the vehicle seat from a use position, in which the vehicle seat is suitable for transporting people, into a not-in-use position, in particular into an access position, which facilitates access to a rear row of seats, wherein the vehicle seat can be transferred from the use position into the not-in-use position, and vice versa (that is to say from the not-in-use position back into the use position), by a drive device, wherein, for securing purposes in the use position, the vehicle seat has a rear foot with a locking device, which can be locked to a mating element.

BACKGROUND

DE 10 2008 050 468 B3 discloses a vehicle seat which can be transferred from at least one use position, in which the vehicle seat is suitable for transporting people, into a pivoted-forward, access position and, as an alternative, into a lowered, flat-floor position. The vehicle seat comprises a base, also comprises a swing arm, which is articulated on a front foot, which is fitted on the base, also comprises a seat-cushion support, from which an arm juts out to the rear, a joint being arranged at the end of the arm, also comprises two control arms, which are articulated at least indirectly on the front foot, which is fitted on the base, also comprises a rear foot, which is articulated on the control arms and is locked to the base in a releasable manner, and also comprises a backrest, which is articulated on the rear foot so as to be pivotable, by way of at least one lockable fitting, about a pivot axis of the backrest. The seat-cushion support is articulated on the backrest by the joint which is arranged in an offset state in relation to the pivot axis of the backrest, with the pivot axis parallel thereto, wherein, when the vehicle seat is being transferred into the access position, the rear foot unlocks and, by way of the two control arms, moves away from the base and, in the process, the rear end of the seat cushion rises up, while the backrest pivots forward, maintaining its inclination relative to the rear foot, and wherein the swing arm pivots forward and the front end of the seat cushion lowers.

SUMMARY

The problem of the invention is to provide a vehicle seat of the type mentioned in the introduction, in particular a vehicle seat which has an anti-trap safeguard for reliably avoiding trapping.

This problem is solved according to the invention by a vehicle seat, in particular a motor-vehicle seat, having a seat part, a backrest, and a kinematics mechanism for transferring the vehicle seat from a use position, in which the vehicle seat is suitable for transporting people, into a not-in-use position, in particular into an access position, which facilitates access to a rear row of seats, wherein the vehicle seat can be transferred from the use position into the not-in-use position, and vice versa, by a drive device, wherein, for securing purposes in the use position, the vehicle seat has a rear foot with a locking device, which can be locked to a mating element, wherein the vehicle seat has a safeguard device, in particular a safeguard device arranged in the region of the locking device, for the purpose of detecting an obstruction in a movement path of the rear foot when the vehicle seat is being transferred from the not-in-use position into the use position.

Since the vehicle seat has a safeguard device for the purpose of detecting an obstruction in a movement path of the rear foot when the vehicle seat is being transferred from the not-in-use position into the use position, the presence of an obstruction, in particular between the rear foot and the mating element, can be established in good time and, by stopping the transfer of the vehicle seat back into the use position, it is possible to prevent damage to the obstruction, in particular an item for transportation, or trapping of the obstruction, in particular a part of the body of a passenger occupying a rear row of seats, for example the passenger's foot. The safeguard device is preferably arranged in the region of the locking device. The safeguard device can be fastened on the locking device. The safeguard device can cover the rear foot in the region of the locking device.

A not-in-use position within the context of the invention can mean an access position, in particular an easy-entry position, in which the vehicle seat has been pivoted forward or also a loading position, in which the vehicle seat has been pivoted forward in order to maximize an amount of stowage space.

The safeguard device can have a panel. The panel can serve to cover the rear foot, in particular in the region of the locking device. The panel can have two parallel wall portions. The panel can have an opening. In the mounted state of the panel, the opening can be aligned with the receiving opening of the locking device, and therefore the mating element can be introduced through the opening into the receiving opening of the locking device. The mating element can be a bolt.

A contact element can be arranged on at least one edge portion of the opening. The contact element can be fastened on the panel so as to be pivotable to a limited extent, in particular to a slight extent. The contact element can be fastened on the panel by a hinge, in particular by a film hinge. The contact element can be mounted on the panel in a linearly movable manner. As the contact element moves, in particular pivots, out of a normal position, the contact element can act on a switch. The switch can be arranged on an inner side of the wall portion of the panel.

The contact element of the panel, which is mounted on the rear foot, can be arranged in the region of the locking device, particularly in the region of the receiving opening of the locking device. The contact element can be configured to project from an outer surface of the panel. The contact element is preferably configured so as to project from an outer surface of the panel in a vertical direction.

The contact element can serve, when the vehicle seat is being transferred from the access position into the use position, to detect an obstruction between the locking device and the mating element. The obstruction can be a bag, a shoe of a passenger occupying a rear row of seats, or some other item for transportation which has been placed in the footwell of the rear row of seats.

When the contact element has been pivoted out of the normal position, the contact element can act on the switch, which, in turn, acts on a drive device for the purpose of pivoting the vehicle seat, and the transfer of the vehicle seat into the use position stops. If appropriate, in the event of transfer of the vehicle seat into the use position being stopped on account of an obstruction being established, it is possible to trigger transfer of the vehicle seat back into the access position.

DESCRIPTION OF THE FIGURES

The invention will be explained in more detail hereinbelow with reference to an advantageous exemplary embodiment illustrated in the figures. However, the invention is not limited to this exemplary embodiment. In the figures.

DETAILED DESCRIPTION

Figure 1:
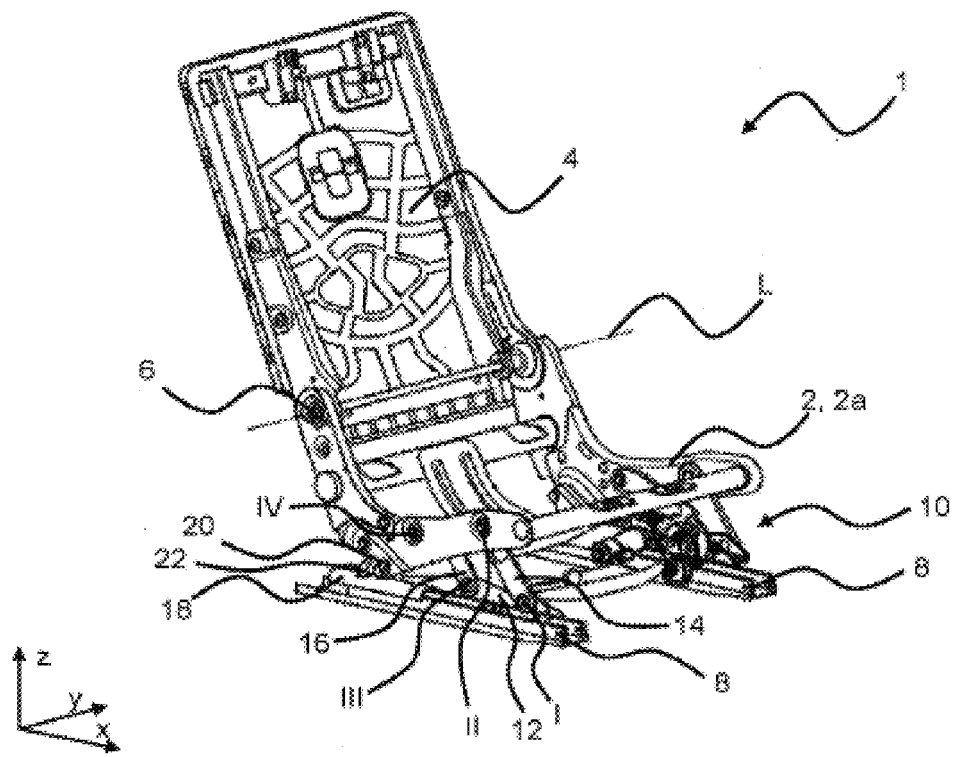
FIG. 1 shows a perspective view of a vehicle seat according to the invention in a use position.

The vehicle seat 1 illustrated schematically in FIG. 1 will be described hereinbelow using three directions in space which run perpendicularly in relation to one another. A longitudinal direction x runs, for a vehicle seat 1 installed in the vehicle, largely horizontally and preferably parallel to a longitudinal direction of the vehicle, which corresponds to the customary direction of travel of the vehicle. A transverse direction y, which runs perpendicularly in relation to the longitudinal direction x, is likewise oriented horizontally in the vehicle and runs parallel to a transverse direction of the vehicle. A vertical direction z runs perpendicularly in relation to the longitudinal direction x and perpendicularly in relation to the transverse direction y. For a vehicle seat 1 installed in the vehicle, the vertical direction z runs parallel to the vertical axis of the vehicle.

The information used in relation to position and direction, for example forward, to the rear/rearward, upward and downward, relates to a viewing direction of an occupant sitting in the normal position in the vehicle seat 1, wherein the vehicle seat 1 is installed in the vehicle in a use position suitable for transporting people, and with the backrest 4 upright, and is oriented, as is customarily the case, in the direction of travel.

The vehicle seat 1 has the backrest 4 and a seat part 2. The backrest 4 can be adjusted in inclination by way of at least one fitting 6, in this case two fittings 6, about a pivot axis L of the backrest, and therefore a number of use positions are defined. The term seat part should be understood to mean the entire assembly comprising a seat-part structure 2a and associated upholstery. If components are articulated on the seat part 2, these should be understood to include a means of articulation on the seat-part structure 2a, in particular a seat-frame side part of the seat-part structure 2a, of the seat part 2. The same applies to the backrest 4.

Figure 2:
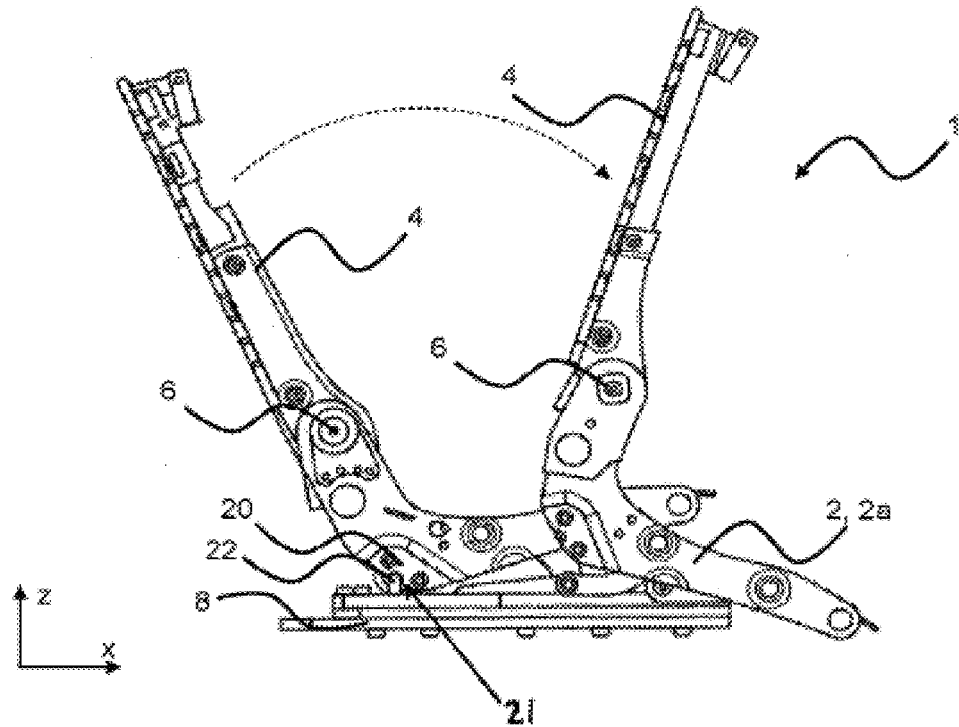
FIG. 2 shows a side view of the vehicle seat from FIG. 1 in the use position and, in a super-imposed state, in an access position.

FIGS. 1 and 2 show a vehicle seat 1 according to the invention. For the sake of simplicity, the following text will describe just one side of the essentially symmetrical vehicle seat 1, i.e., unless described to the contrary, two of each of the components mentioned hereinbelow are provided (if appropriate in a mirror-symmetrical manner). In the first instance, the vehicle seat 1 will be described with reference to a specific use position illustrated in FIG. 1, that is to say a design position in which the backrest 4 has been inclined rearward by for example 23° in relation to the vertical.

The vehicle seat 1 here has a longitudinal adjuster 8 for the purpose of adjusting a longitudinal position of the seat. Such a longitudinal adjuster is known, for example, from DE 10 2010 010 585 B4, of which the disclosure content relating to the construction and the function of the longitudinal adjuster is hereby expressly included.

A base of the vehicle seat 1 can be connected to the structure of the motor vehicle. The base here is designed in the form of a longitudinal adjuster 8, which makes it possible for the vehicle seat 1 to be adjusted longitudinally. The base here has a floor rail, which is connected directly to the vehicle structure, and a seat rail, which can be displaced in the longitudinal direction x relative to the floor rail. The two profiled rails engage one behind the other by way of their inwardly and outwardly curved longitudinal edges. The longitudinal adjuster 8 can preferably be displaced, in a manner known per se, into any desired longitudinal-adjustment position within a predefined adjustment region by a spindle drive. As an alternative, it is likewise possible to provide a longitudinal adjuster of which the rails can be locked to one another by a rail-locking means which is known per se, wherein the rail-locking means can be unlocked manually by the passenger occupying the vehicle seat 1 using an unlocking lever which is known per se.

A front foot 12 is fitted on the base, to be precise, in the present case, is fixed to the seat rail. As an alternative, it is also possible for the front foot 12 to be locked to the base, in particular the seat rail, in a releasable manner.

The seat part 2 is articulated in the region of a front end of the front foot 12 by a rocker arm 14, wherein this rocker arm 14 has two ends and a rotary joint is provided in the region of each of these two ends. The rotary joints make it possible for components to be rotated about a respective axis of rotation which, in this case, runs parallel to the transverse direction y. A first rotary joint I forms a means of articulating the rocker arm 14 on the front foot 12. A second rotary joint II forms a means of articulating the rocker arm 14 at the front end of the seat part 2. The rocker arm 14 on the left-hand side of the vehicle seat can be connected to the rocker on the right-hand side of the vehicle seat via a transverse connection, in this case a transverse tube.

The seat part 2 is also articulated on the front foot 12 by a control arm 16, which is arranged behind the rocker arm 14. The control arm 16 has two ends, wherein a respective rotary joint is provided in the region of these two ends. A third rotary joint III forms a means of articulating the control arm 16 on the front foot 12. A fourth rotary joint IV forms a means of articulating the control arm 16 on the seat part 2. Precisely one such control arm 16 is arranged, correspondingly, on either side of the vehicle seat 1. The front foot 12, the rocker arm 14, the control arm 16 and the seat part 2 form a four-joint arrangement.

The vehicle seat 1 can be moved about the four-joint arrangement, along a predetermined movement path, from the use position, corresponding to the vehicle seat 1 illustrated on the left-hand side of FIG. 2, into the access position, corresponding to the vehicle seat 1 illustrated in a superimposed state on the right-hand side of FIG. 2, and back from the access position into the use position. A drive device is preferably provided for the purpose of transferring the vehicle seat 1 from the use position into the access position and back. The drive device is preferably controlled electronically.

The base also has arranged on it behind the front foot 12, as seen in the longitudinal direction x, a rear foot 18, which is formed separately from the front foot 12. The rear foot 18 on the left-hand side of the vehicle seat is connected to the rear foot 18 on the right-hand side of the vehicle seat via a transverse connection.

The rear foot 18 on the left-hand side of the vehicle seat is largely mirror-symmetrical in relation to the rear foot 18 on the right-hand side of the vehicle seat, and therefore just one rear foot 18 will be described hereinbelow. The rear foot 18 can be locked to the base in a releasable manner by a locking device 20, which is arranged on the rear foot 18, more specifically it can be locked to a base-mounted mating element 22, in this case a bolt fastened on the seat rail, and it can therefore be connected indirectly to the vehicle structure. In a state in which it is locked by the locking device 20, the mating element 22 is centered in a slot like receiving opening 21 in the rear foot 18, or as an alternative in a housing of the locking device 20, and is prevented from coming out of the receiving opening 21 by a catch of the locking device 20. The receiving opening 21 has a V-shaped contour and is open in the direction of the base. The receiving opening 21 tapers conically in a direction oriented away from the base. In the use position of the vehicle seat 1, the receiving opening 21 and the catch of the locking device 20 fix the rear foot 18 relative to the base.

Figure 3:
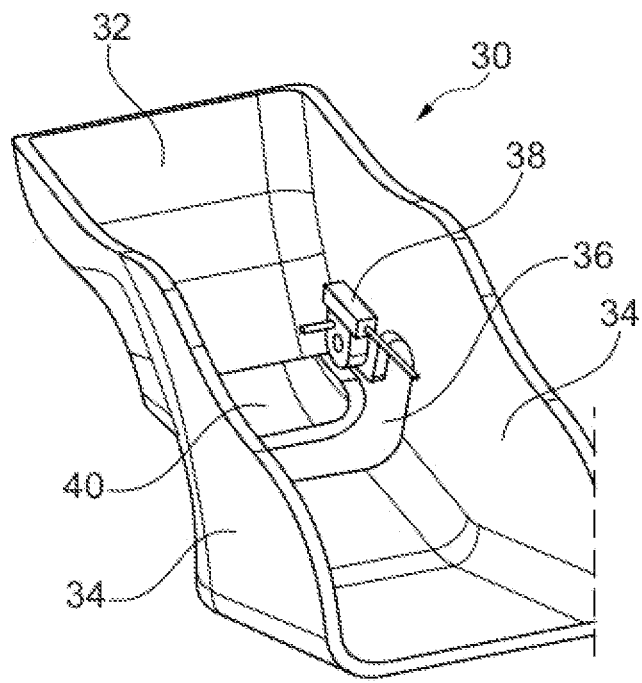
FIG. 3 shows a perspective view of a safeguard device.

FIG. 3 shows a safeguard device 30 having a panel 32. The panel 32 serves to cover the rear foot 18 in the region of the locking device 20. The panel 32 has two, in particular parallel, wall portions 34. The panel 32 has an opening 36, which can also be known as a mating opening 36. In a mounted state of the panel 32, the opening 36 is aligned with the receiving opening 21 of the locking device 20 such that the mating element 22 can be introduced through the opening 36 into the receiving opening 21 of the locking device 20. A contact element 40 is arranged on at least one edge portion of the opening 36. The contact element 40 is fastened on the panel 32 so as to be pivotable to a limited extent. The contact element 40 is preferably fastened on the panel 32 by a hinge, in particular a film hinge. As the contact element 40 pivots out of a normal position, the contact element 40 acts on a switch 38, which in this case is arranged on an inner side of the wall portion 34.

The panel 32 is mounted on the rear foot 18. The contact element 40 of the safeguard device 30, which is mounted on the rear foot 18, is arranged in the region of the locking device 20, in particular in the region of the receiving opening 21 of the locking device 20.

Figure 4:
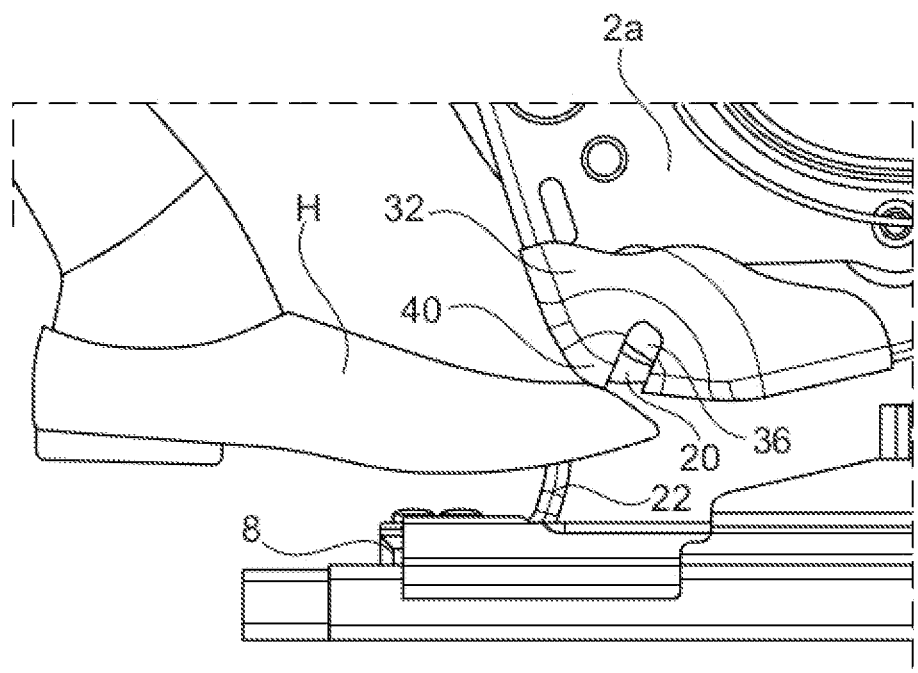
FIG. 4 shows, in detail form, a side view of the vehicle seat in the region of a rear foot when the vehicle seat is being transferred from the not-in-use position into the use position, prior to the occurrence of avoidable trapping.

As shown in FIG. 4, the contact element 40 serves, when the vehicle seat 1 is being transferred from the access position into the use position, to detect an obstruction H between the locking device 20 and the mating element 22. The obstruction H here is represented, by way of example, by the shoe of a passenger sitting on a rear row of seats. The obstruction H can likewise be a bag or some other item for transportation which has been placed in the footwell of the rear row of seats.

Figure 5:
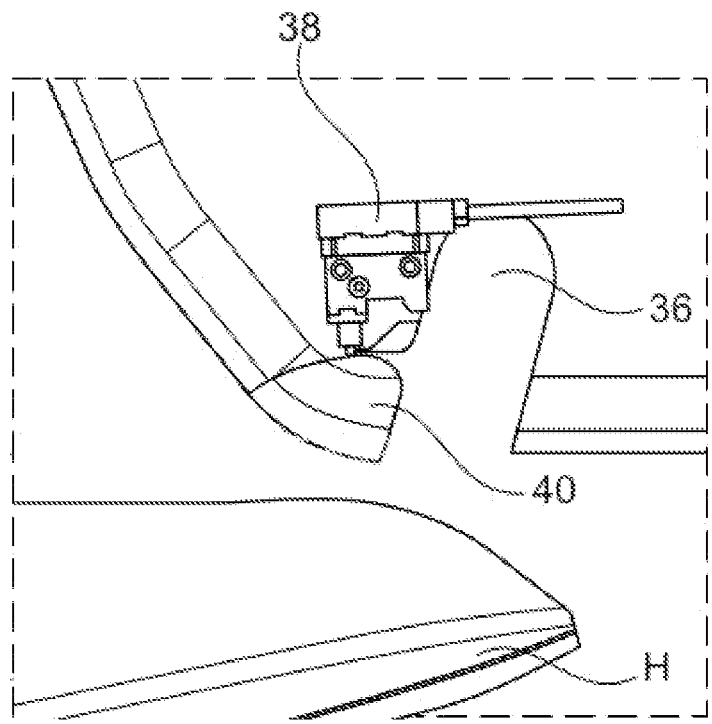
FIG. 5 shows an enlarged detail from FIG. 4 with the safeguard device in a deactivated state.
Figure 6:
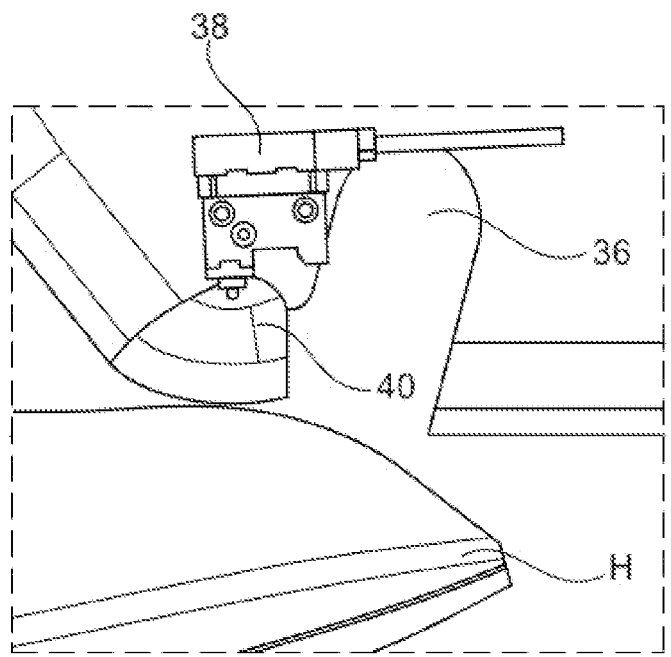
FIG. 6 shows an illustration corresponding to FIG. 5 and with the safeguard device in an activated state.

FIGS. 5 and 6 show the vehicle seat 1 in the region of the safeguard device 30 when the vehicle seat 1 is being transferred from the access position into the use position, just prior to the use position being reached.

In FIG. 5, the contact element 40 is still located in the normal position, in which the switch 38 has not been actuated.

In FIG. 6, the vehicle seat 1 has been displaced some distance further in the direction of the use position. The contact element 40 has come into contact with the obstruction H located in the movement path of the rear foot 18 of the vehicle seat 1. The obstruction H is arranged between the mating element 22 and the contact element 40, and the continued movement of the vehicle seat 1 in the direction of the use position has pivoted the contact element 40 out of the normal position of the contact element 40. As a result, the contact element 40 acts on the switch 38, which, in turn, acts on a drive device for the purpose of pivoting the vehicle seat 1, such that transfer of the vehicle seat 1 into the use position stops and therefore avoids trapping, where the obstruction H would be subjected to a high level of force. If appropriate, transfer of the vehicle seat 1 back into the access position can be triggered.

The features disclosed in the above description, the claims and the drawings may be important both individually and in combination for the purpose of realizing the various configurations of the invention.

Terms such as "comprise", "have", "include", "contain" and the like used in the claims do not rule out other elements or steps. The use of the indefinite article does not rule out a plurality. An individual device can perform the functions of a plurality of devices or units mentioned in the claims.

LIST OF REFERENCE SIGNS

1 Vehicle seat
2 Seat part
2a Seat-part structure
4 Backrest
6 Fitting
8 Longitudinal adjuster
10 Kinematics mechanism
12 Front foot
14 Swing arm
16 Control arm
18 Rear foot
20 Locking device
21 Receiving opening
22 Mating element
30 Safeguard device
32 Panel
34 Wall portion
36 Opening/Mating opening
38 Switch
40 Contact element
H Obstruction
L Pivot axis of the backrest
I First rotary joint
II Second rotary joint
III Third rotary joint
IV Fourth rotary joint
x Longitudinal direction
y Transverse direction
z Vertical direction

The invention claimed is:

1. A motor vehicle seat, comprising:
a seat part,
a backrest, and
a kinematics mechanism for transferring the vehicle seat from a use position, in which the vehicle seat is suitable for transporting people, into a not-in-use, or access, position which facilitates access to a rear row of seats,
wherein the vehicle seat can be transferred from the use position into the not-in-use position, and vice versa,
wherein, for securing purposes in the use position, the vehicle seat has a rear foot with a locking device, which can be locked to a mating element,
wherein the vehicle seat has a safeguard device arranged in the region of the locking device, for detecting an obstruction in a movement path of the rear foot when the vehicle seat is being transferred from the not-in-use position into the use position, wherein the safeguard device has a panel, wherein the panel has a mating opening which, in the mounted state of the panel, is aligned with a receiving opening of the locking device, and therefore a mating element can be introduced through the mating opening into the receiving opening of the locking device, wherein a contact element is arranged on at least one edge portion of the mating opening, wherein the contact element is configured so as to project from an outer surface of the panel, wherein the contact element is fastened on the panel so as to be pivotable to a limited extent.

2. The vehicle seat as claimed in claim 1, wherein the panel serves as a cover for the rear foot, including the region of the locking device.

3. The vehicle seat as claimed in claim 1, wherein the mating element is a bolt.

4. The vehicle seat as claimed in claim 1, wherein the contact element is configured so as to project from an outer surface of the panel in a vertical direction.

5. The vehicle seat as claimed in claim 1, wherein the contact element is fastened on the panel by a hinge.

6. The vehicle seat as claimed in claim 5, wherein the contact element is fastened on the panel by a film hinge.

7. The vehicle seat as claimed in claim 1, wherein, as the contact element moves out of a normal position, the contact element acts on a switch.

8. The vehicle seat as claimed in claim 7, wherein the switch is arranged on an inner side of a wall portion of the panel.

9. The vehicle seat as claimed in claim 1, wherein the contact element serves, when the vehicle seat is being transferred from the access position into the use position, to detect an obstruction between the locking device and the mating element.

10. A motor vehicle seat, comprising:

a seat part, a backrest, and a mechanism for transferring the vehicle seat from a use position, to a not-in-use position, wherein the vehicle seat can be transferred from the use position into the not-in-use position, and vice versa, wherein the vehicle seat has a rear foot with a locking device, which can be locked to a mating element, wherein the vehicle seat has a safeguard device arranged in the region of the locking device, for detecting an obstruction in a movement path of the rear foot when the vehicle seat is being transferred from the not-in-use position into the use position, wherein the safeguard device has a panel, wherein the panel has a mating opening which, in the mounted state of the panel, is aligned with a receiving opening of the locking device, and therefore a mating element can be introduced through the mating opening into the receiving opening of the locking device, wherein a contact element is arranged on at least one edge portion of the mating opening, wherein the contact element is configured so as to project from an outer surface of the panel, wherein the contact element is fastened on the panel by a hinge.

11. The vehicle seat as claimed in claim 10, wherein the contact element is fastened on the panel by a film hinge.

12. A motor vehicle seat, comprising:

a seat part, a backrest, and a mechanism for transferring the vehicle seat from a use position to a not-in-use position, wherein the vehicle seat can be transferred from the use position into the not-in-use position, and vice versa, wherein the vehicle seat has a rear foot with a locking device, which can be locked to a mating element, wherein the vehicle seat has a safeguard device arranged in the region of the locking device, for detecting an obstruction in a movement path of the rear foot when the vehicle seat is being transferred from the not-in-use position into the use position, wherein the safeguard device has a panel, wherein the panel is mounted to the locking device, wherein a contact element is configured so as to project from an outer surface of the panel, wherein the contact element is fastened to the panel by a hinge.

* * * * *